(12) United States Patent
Goldman

(10) Patent No.: US 8,063,004 B2
(45) Date of Patent: Nov. 22, 2011

(54) CHEMICAL COMPOSITION OF MATTER FOR THE LIQUEFACTION AND DISSOLUTION OF ASPHALTENE AND PARAFFIN SLUDGES INTO PETROLEUM CRUDE OILS AND REFINED PRODUCTS AT AMBIENT TEMPERATURES AND METHOD OF USE

(75) Inventor: Gordon K. Goldman, Metairie, LA (US)

(73) Assignee: Malcera, L.L.C., Metairie, LA (US)

( * ) Notice: Subject to any disclaimer, the term of this patent is extended or adjusted under 35 U.S.C. 154(b) by 942 days.

(21) Appl. No.: 11/186,445

(22) Filed: Jul. 21, 2005

(65) Prior Publication Data

US 2006/0035793 A1 Feb. 16, 2006

Related U.S. Application Data

(60) Provisional application No. 60/590,226, filed on Jul. 22, 2004.

(51) Int. Cl.
*C10M 137/04* (2006.01)
*C10M 159/06* (2006.01)
*C10M 107/34* (2006.01)

(52) U.S. Cl. ........ 508/433; 508/451; 508/459; 508/491; 508/579; 508/582; 208/24; 208/39; 208/370

(58) Field of Classification Search .................. 508/433, 508/459, 491, 579, 451, 582; 208/24, 39, 208/370
See application file for complete search history.

(56) References Cited

U.S. PATENT DOCUMENTS

| | | | |
|---|---|---|---|
| 3,554,913 A | | 1/1971 | Gisser et al. |
| 3,599,715 A | * | 8/1971 | Roszelle .................... 166/270.1 |
| 4,740,323 A | | 4/1988 | Suzuki et al. |
| 4,742,039 A | * | 5/1988 | Hanauer et al. ................ 502/407 |
| 6,204,227 B1 | | 3/2001 | Rao et al. |
| 6,322,621 B1 | | 11/2001 | Goldman |
| 6,358,895 B1 | | 3/2002 | Phillips |
| 6,652,609 B1 | * | 11/2003 | Caprotti .......................... 44/370 |
| 6,780,824 B2 | | 8/2004 | Oelscher et al. |
| 6,783,582 B2 | | 8/2004 | Goldman |
| 2002/0066391 A1 | * | 6/2002 | Goldman ...................... 106/271 |

* cited by examiner

*Primary Examiner* — Ellen McAvoy
*Assistant Examiner* — Taiwo Oladapo
(74) *Attorney, Agent, or Firm* — Garvey, Smith, Nehrbass & North, LLC; Seth M. Nehrbass; Vanessa M. D'Souza

(57) ABSTRACT

A chemical composition of matter comprising a wax plasticizing agent (plasticizer) tributoxyethyl phosphate, a mixture of selected long chain fatty acids (preferably $C_{10}$ to $C_{22}$), and a mixture of selected low-surface tension surfactants, which when added in solution to crude oil or refined products has been shown to lower both the B.S. & W. (rag layer) and the coefficient of friction of crude oils and refined products. This chemical composition of matter is particularly useful as a wax liquefaction, dispersant, and solubilization agent for asphaltene and paraffins in crude oil and refined products. The reduction in the co-efficient of friction resulting from the addition of this product to crude oil will allow crude oil to pump through pipelines with a minimum amount of resistance due to friction (drag).

42 Claims, No Drawings

CHEMICAL COMPOSITION OF MATTER FOR THE LIQUEFACTION AND DISSOLUTION OF ASPHALTENE AND PARAFFIN SLUDGES INTO PETROLEUM CRUDE OILS AND REFINED PRODUCTS AT AMBIENT TEMPERATURES AND METHOD OF USE

CROSS-REFERENCE TO RELATED APPLICATIONS

Priority of my U.S. Provisional Patent Application Ser. No. 60/590,226, filed 22 Jul. 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to more efficient use of petroleum. More particularly, the present invention relates to a chemical composition of matter for the liquefaction and dissolution of paraffin waxes and asphaltenes into petroleum crude oil and distillate products at ambient temperatures.

The present invention relates generally to converting crystalline wax, as for example, exists in slop oil, crude oil and refined distillate products, into an amorphous form of wax, causing it to be dissolvable in for example, crude oil at ambient temperature and maintained in a dissolved state for a prolonged period of time at ambient temperature, and more particularly, in its preferred, exemplary embodiment, to the use preferably of a chemical composition of surfactants, leveling or plasticizing agents (plasticizers) and blends of fatty acids that can, for example, recover waste hydrocarbon products (paraffin waxes and asphaltenes) from both naturally occurring and synthetic sources, and more particularly to recover these waste hydrocarbon products for use as energy sources and to reduce environmental pollution. A number of other applications are also disclosed and claimed.

2. General Background of the Invention

Waxy materials present in crude oils and in the high boiling fractions of distillates are considered to be crystalline throughout but under certain conditions may behave like a colloid. Certain wax solutions of refined products such as petrolatum, when agitated or mixed for long periods near or at the crystallizing temperature, will form a completely transparent jelly. But the same solution, when chilled rapidly with moderate agitation will precipitate a wax that can be centrifuged.

It was observed many years ago in the sweating of solid paraffins at the petroleum refinery that three crystalline forms (manifestations) of wax are involved. These are known as "plate", "malcrystal", and "needle" (note, for example, The Chemistry and Technology of Waxes by Albin H. Warth, published by Reinhold Publishing Corp. (New York, 1947) p. 239). It was recognized that the relative proportion of these types of crystals not only has a relationship to the source of the crude but also to the process of handling the wax.

The members of each series crystallize similarly as either plates, malcrystals, or needles. If one type is present (plate, mal, or needle), the crystal form remains the same regardless of such factors as the amount and kind of solvent.

When crude oil is pumped from the ground and transported through pipelines, transported by ocean tankers, or stored in storage tanks on land or offshore, a large amount of heavy material separates and comes out of solution. The main component of this residue is high molecular weight (high melting point) paraffin waxes. In some cases the wax represents as much as 90 percent of the deposited residues.

The amounts of wax present in crude oil are to a large extent an indicator of its origin, whether the crude originated in Venezuela, Mexico, or Malaysia.

The mixture of wax, oil, sand, and water is referred to as "slop oil", or "slop" (sludge), in the petroleum industry. The percentage of slop oil varies according to the type of crude and the conditions under which it has been transported. Usually the amount of slop oil ranges from a low of 0.5% to a high of 10%; normally, it is in the range of 2% to 5%.

For the last century and until today the only way to keep slop oil from separating from crude oil is to heat the slop oil while it is being transferred into mixing tanks with crude oil. The cost of keeping slop oil from separating from crude oil is a function of many variables such as temperature, solvent diluents (cutter stocks), and residence time of the crude in a tank or pipeline.

The petroleum industry is plagued with the problem of having to deliver crude oil to refineries in a timely and economic manner with a minimum amount of slop oil separation. If a pipeline becomes plugged up or clogged because of paraffin wax precipitating out during the pumping operation, a crisis can arise. Numerous pipelines worldwide are clogged daily or monthly due to wax precipitating out of the crude oil. Daily, 80,000,000 barrels of crude oil are pumped from the ground worldwide (as of May, 2004). If 5% of the heavy residues separated out of the crude oil being transported, whether by pipeline or tanker, the amount of slop oil or crude residue formed would be 4,000,000 barrels per day. This amounts to 1.5 billion barrels per year. If 70% of this slop oil is useable crude which can be processed to refine production, then the amount of recoverable hydrocarbon equals over 1.0 billion barrels per year. At a cost of $10.00/barrel for crude oil this amounts to the recovery of $10 billion per year of useable hydrocarbon as either energy or petrochemical feedstock.

In storage tanks the problems associated with wax settling out are tremendous and present an extremely challenging task for petroleum production companies, refiners and terminal operators.

When crude oil remains idle and cold in a storage tank, a heavy residue forms that, over time, accumulates at the bottom of the tank and reduces the tank's useable volume. This residue, known as slop oil (or slop, or sludge) consists of heavy paraffinic waxes and asphaltenes which solidify in crystalline form. Slop oil is extremely difficult to remove from tanks and presents a very costly disposal problem for the refinery and terminal operator.

Traditional tank cleaning methods use a combination of heat (e.g., 60 to 70 degrees C. or greater) and mechanical agitation to force the slop oil back into solution with crude oil, so the mixture can be pumped out of the tank. In order to keep the waxes and asphaltenes in solution in the crude oil, the mixture must be kept at high temperature, for example, 75 degrees C. or greater and, in most cases, continuously circulated. The tremendous amounts of energy required to heat and circulate large volumes of dense crude oil at these elevated temperatures over long periods of time increases handling costs dramatically.

After pumping out the slop oil containing paraffin waxes and asphaltenes, the slop oil mixture must be kept hot or the wax will separate from solution, and the problems associated with slop oil will recur. This need to use heat results in high energy costs and large losses.

For general background, "prior art" information pertinent to the invention, reference is made to (all incorporated herein by reference):

The Chemistry and Technology of Waxes by Albin H. Warth, published by Reinhold Publishing Corp. (New York, 1947), p. 239 et al;

Petroleum Refinery Engineering by W. L. Nelson, published by McGraw-Hill Book Co. (New York, 4th Ed. 1958), particularly Chapter 12 "DeWaxing" (pp 374-75 et seq.);

Physical Chemistry by Walter J. Moore, published by Prentice-Hall, Inc. (New York, 1955), particularly Chapter 16 "Surface Chemistry" (p. 498 et seq.); and chemical and process technology encyclopedia edited by Douglas M. Considine, published by McGraw-Hill Co. (New York, 1974), particularly its sub-section on "Waxes" (p. 1167 et seq.);

Composition and crystal form of the petroleum waxes, S. W. Ferris, H. C. Cowles, Jr., and L. M. Henderson (The Atlantic Refining Company) Industrial and Engineering Chemistry, June 1931, (pp 681 to 688); all references included in this article;

Crystal behavior of paraffin wax, S. W. Ferris and H. C. Cowles (The Atlantic Refining Company), Industrial and Engineering Chemistry, Nov., 1945 (pp 1054 to 1062); all references included in this article.

The following US Patent Documents are incorporated herein by reference: U.S. Pat. Nos. 6,783,582; 6,322,621; 3,554,913; Published US Patent Application Pub. No. US 2002/0066391 A1; and all references cited in these patent documents.

BRIEF SUMMARY OF THE INVENTION

The invention herein relates primarily to the liquefaction and dissolution of paraffin and asphaltene sludges in crude oil. Crude oils on standing at temperatures below the melt temperature of asphaltene and paraffin wax will result in the formation and separation of insoluble sludge and sediment deposits. These sludge deposits represent a serious problem to the petroleum industry. When paraffins and asphaltenes separate from crude oil in producing wells the pipes through which the crude oil flows become clogged and subsequently all flow ceases resulting in the shutdown of the well. As a result of this shutdown, oil production can only be put back online by the use of mechanical methods such as vertical scrapers or by the injection of hot oil. Both of these methods are very costly.

Another problem which arises from the storage of crude oil is the accumulation of asphaltene and paraffin wax sludges. These sludges are formed by asphaltenes and paraffin waxes precipitating out of the crude oil on standing for long periods of time and can result in increases in the viscosity of the crude oil in the tank and make it difficult to pump the crude oil out of the tank. Large quantities of paraffin and asphaltene sludges in crude oil tanks have the added effect of increasing the cost of tank cleanups.

The accumulation of moisture from the air which enters the tank and condenses to form an aqueous layer, which if emulsified with the crude oil or refined products may cause rusting and corrosion in the tanks, pumping lines and associated equipment. The presence of sludges will tend to trap the moisture and increase corrosion and rusting in the tanks.

One of the major economic impacts of asphaltene and paraffin sludges on the petroleum market occurs when paraffins and asphaltenes separate from crude oils during ocean transport. When crude oil is traded between a seller and a buyer, the seller discounts the amount of crude oil depending upon the amount of sludge that separates from the crude oil. For example, if a transaction involving a sale of 100,000 bbls (15,876,000 liters) of crude oil involves a sludge separation (B.S. & W.—bottom sediment and water) of 3 percent, the buyer only pays for 97,000 bbls (15,399,720 liters) of crude oil and the seller loses the economic value of 3,000 bbls (476,280 liters). In countries such as Indonesia, Malaysia, Thailand, Russia and Venezuela where the paraffin and asphaltene contents can reach as much as 10 percent such a correction discount can have large economic impact.

It is also the object of the present invention to alleviate the horrendous environmental problems created by the disposal of crude oil sludges. The reduction in crude oil sludges would have an enormous impact on how crude oil sludge wastes are disposed of and treated. The waste minimization of asphaltene and paraffinic sludges can have an enormous impact on how the petroleum, petrochemical and energy industries will operate in the future.

A. The objectives of this invention are attained by formulating a chemical composition of matter derived from the blending of a wax leveling or plasticizing agent (plasticizer), tributoxyethylphosphate aka (TBEP or KP-140) which acts to convert crystalline paraffin wax into an amorphous form of wax and in the presence of selected surfactants, and friction reducing and solubilizing agents such as selected fatty acids, can affect the liquefaction and dissolution of wax and prevent their agglomeration in hydrocarbon solutions.

B. The concentrations (weight percent) of the components of the chemical composition of matter described herein are preferably as follows:

1. The wax leveling or plasticizing agent (plasticizer) tributoxyethylphosphate (aka, TBEP and/or KP-140) (cited in U.S. Pat. No. 6,322,621) has been shown to plasticize asphaltenes and paraffin waxes in slop oil at temperatures above 150° F. (66° C.) and in the presence of high concentrations of water. In the present invention I have found that in the absence of water, tributoxyethylphosphate (aka TBEP and/or KP-140) as a component of a totally water-free blend in which the concentration of tributoxy ethylphosphate ranges from 0.5 to 95 weight percent with an optimum concentration of about 40-60 weight percent can plasticize and solubilize paraffin wax and asphaltenes in crude oil at temperatures between 30 and 60° F. (−1 and 16° C.).

2. The mixture of long chain fatty acids ranging in carbon chain length from $C_{10}$ to $C_{22}$ (see Table 1 for mixture composition), having a concentration in the final chemical composition of matter described in this invention ranging from 5 to 90 weight percent. The optimum concentration is about 40-60 weight percent of the final composition of matter.

3. A mixture of surfactants preferably capable of reducing the surface tension of a hydrocarbon mixture to below 10 dynes/cm, having a concentration range of 0.5 to 3.0 weight percent with the optimum concentration being around 1.0 weight percent of the final composition.

The preferred, exemplary chemical compound mixture described herein will perform, inter alia, the following functions:

1. Convert the wax in, for example, the slop oil or crude oil from a crystalline to an amorphous material.
2. Cause the amorphous form of the wax to be dissolved into crude oil from which it originated or refined distillate products such as diesel or lube base oil.

3. Help in dissolving the asphaltene components present in crude oil and keeping the asphaltenes in solution.
4. Allow any water or non-organic material (inorganic solids, such as rust, sand and salt) to separate out (it acts as a demulsifier and dispersing agent).

In addition to the exemplary application of use with crude oil, there are many other applications of the principles and teachings of the present invention, as detailed and exemplified below, all with great utilitarian benefits.

The present invention includes a substantially non-aqueous composition for reducing the viscosity of petroleum paraffin wax and/or asphaltenes found in petroleum, the composition comprising a blend of a plasticizing agent for plasticing wax or asphaltenes, a solubilizing agent for solubilizing wax or asphaltenes, and a surface active agent capable of reducing the surface tension of the blend to an interfacial surface tension of less than 20 dynes per cm2. The plasticizing agent is preferably tributoxyethylphosphate (KP-140), tributyl phosphate, tri-isobutyl phosphate, tris (2-ethylhexy) phosphate Flexol TOF (Reomol TOF), or tricresyl phosphate, or a combination of two or more of these; more preferably, the plasticizing agent is tributoxyethylphosphate (KP-140), tributyl phosphate, or tris (2-ethylhexy) phosphate Flexol TOF (Reomol TOF), or a combination of two or more of these. The solubilizing agent is preferably vegetable oil, crude oil, petroleum distillates, turpentine, pine oil, gas-to-liquid fuels (G.T.L.), fatty acids, a blend of fatty acids, esterified fatty acids, amidified fatty acids, turpentine, pine oil, glycol ethers, or n-methyl-2-pyrrolidone aka M-PYROL, or a combination of two or more of these. The surface active agent is preferably: nonionic ethoxylated alcohols surfactant (HLB ranging from about 10.0 to about 15.0), nonionic fluorosurfactants (HLB ranging from about 10.0 to about 13.0), or nonionic phosphate ester surfactants (HLB ranging from about 6.0 to about 10.0), or a combination of two or more of these.

The petroleum distillate can be diesel, light cycle oil, lube base oil, mineral oil, vacuum gas oil, middle distillate, kerosene, crude oil tank bottoms, asphalt crude oil, naphtha, or fuel oil, or a combination of two or more of these.

The vegetable oil can be soybean oil, castor oil, coconut oil, corn oil, cottonseed oil, linseed oil, oiticica oil, olive oil, peanut oil, perilla oil, rapeseed oil, safflower oil, sunflower oil, or tung oil, or a combination of two or more of these.

Preferably, the plasticizing agent comprises tributoxyethylphosphate (KP-140), the solubilizing agent comprises fatty acids (and more preferably vegetable oil, and even more preferably soybean oil), and the surface active agent preferably comprises a mixture of a nonionic ethoxylated alcohol surfactant (HLB ranging from about 10.0 to about 15.0), a nonionic fluoroalcohol surfactant (HLB ranging from about 10.0 to about 13.0), and a nonionic phosphate ester surfactant (HLB ranging from about 6.0 to about 10.0).

Preferably, the composition consists essentially of the blend of the plasticizing agent, the solubilizing agent, and the surface active agent. Even more preferably, the composition consists of the blend of the plasticizing agent, the solubilizing agent, and the surface active agent.

Preferably, the surface active agent is capable of reducing the surface tension of the blend to an interfacial surface tension of less than 15 dynes per cm2, even more preferably less than 10 dynes per cm2, even more preferably less than 5 dynes per cm2, and most preferably less than 1 dyne per cm.

Preferably, the plasticizing agent comprises tributoxyethyl phosphate (aka KP-140 or TBEP) and comprises between about 0.5 and 98 percent by weight of the blend, the solubilizing agent comprises between about 5.0 and 90 percent by weight of the blend, and the surface active agent comprises between about 0.5 and 2.5 percent by weight of the blend. More preferably, the plasticizing agent comprises between about 5 and 95 percent by weight of the blend, the solubilizing agent comprises between about 95 and 5 percent by weight of the blend, and the surface active agent comprises between about 0.1 and about 5.0 percent by weight of the blend. Even more preferably, the plasticizing agent comprises between about 15 and 85 percent by weight of the blend, the solubilizing agent comprises between about 85 and 15 percent by weight of the blend, and the surface active agent comprises between about 0.5 and about 4.0 percent by weight of the blend. Even more preferably, the plasticizing agent comprises between about 30 and 65 percent by weight of the blend, the solubilizing agent comprises between about 65 and 30 percent by weight of the blend, and the surface active agent comprises between 1.5 and 3 percent by weight of the blend. Most preferably, the plasticizing agent comprises about 49 percent by weight of the blend, the solubilizing agent comprises about 49 percent by weight of the blend, and the surface active agent comprises about 2 percent by weight of the blend.

The present invention also includes a method of reducing the cloud point of a substance containing petroleum paraffin wax and/or asphaltenes, comprising adding an effective amount of the composition of the present invention.

The present invention also includes a method of reducing the pour point of a substance containing petroleum paraffin wax and/or asphaltenes, comprising adding an effective amount of the composition of the present invention to the substance.

The present invention also includes a method of degreasing paraffin and/or asphaltene containing residues and dirt in towers, columns, and other petrochemical related equipment, storage tanks, cokers, piping in petroleum refining and production sites, in marine and land transportation of petroleum products, comprising adding an effective amount of the composition of the present invention to liquid in the towers, columns, other petrochemical related equipment, storage tanks, cokers, piping in petroleum refining and production sites, in marine and land transportation of petroleum products The present invention also includes a method of reducing the occurrence of foaming when a material with a large bulk density such as asphalt or paraffin is mixed with a liquid with a low density (specific gravity) such as a hydrocarbon solvent (e.g., diesel), comprising adding an effective amount of the composition of the present invention to the liquid.

The present invention also includes a method of liquefying and dissolving petroleum paraffin wax and/or asphaltenes found in petroleum into crude oil and refined distillate products, comprising adding an effective amount of the composition of the present invention to the crude oil or refined distillate products and adding a diluent.

In the methods of the present invention, preferably the plasticizing agent is present in an amount, by volume, of about 0.000010 to 0.0025 parts per part of petroleum paraffin wax and/or asphaltenes, the solubilizing agent is present in an amount, by volume, of about 0.000010 to 0.0025 parts per part of petroleum paraffin wax and/or asphaltenes, and the surface active agent is present in an amount, by volume, of about 0.0000010 to 0.0001 parts per part of petroleum paraffin wax and/or asphaltenes. More preferably, the plasticizing agent is present in an amount, by volume, of about 0.000025 to 0.0025 parts per part of petroleum paraffin wax and/or asphaltenes, the solubilizing agent is present in an amount, by volume, of about 0.000025 to 0.0025 parts per part of petroleum paraffin wax and/or asphaltenes, and the surface active agent is present in an amount, by volume, of about 0.0000050 to 0.0001 parts per part of petroleum paraffin wax and/or asphaltenes. Even more preferably, the plasticizing agent is present in an amount, by volume, of about 0.00025 to 0.0025 parts per part of petroleum paraffin wax and/or asphaltenes, the solubilizing agent is present in an amount, by volume, of about 0.00025 to 0.0025 parts per part of petroleum paraffin wax and/or asphaltenes, and the surface active agent is present in an amount, by volume, of about 0.000025 to 0.0001 parts per part of petroleum paraffin wax and/or asphaltenes.

In the methods of the present invention, preferably the plasticizing agent is present in an amount, by volume, of at least about 0.000010 parts per part of petroleum paraffin wax and/or asphaltenes, the solubilizing agent is present in an amount, by volume, of at least about 0.000010 parts per part of petroleum paraffin wax and/or asphaltenes, and the surface active agent is present in an amount, by volume, of at least about 0.0000010 parts per part of petroleum paraffin wax and/or asphaltenes. More preferably, the plasticizing agent is present in an amount, by volume, of at least about 0.000025 parts per part of petroleum paraffin wax and/or asphaltenes, the solubilizing agent is present in an amount, by volume, of at least about 0.000025 parts per part of petroleum paraffin wax and/or asphaltenes, and the surface active agent is present in an amount, by volume, of at least about 0.0000050 parts per part of petroleum paraffin wax and/or asphaltenes. Even more preferably, the plasticizing agent is present in an amount, by volume, of at least about 0.00025 parts per part of petroleum paraffin wax and/or asphaltenes, the solubilizing agent is present in an amount, by volume, of at least about 0.00025 parts per part of petroleum paraffin wax and/or asphaltenes, and the surface active agent is present in an amount, by volume, of at least about 0.000025 parts per part of petroleum paraffin wax and/or asphaltenes.

In the methods of the present invention, preferably the plasticizing agent is present in an amount, by volume, of at least 0.000010 parts per part of petroleum paraffin wax and/or asphaltenes, more preferably at least 0.000025 parts per part of petroleum paraffin wax and/or asphaltenes, and even more preferably at least 0.00025 parts per part of petroleum paraffin wax and/or asphaltenes.

In the methods of the present invention, preferably the solubilizing agent is present in an amount, by volume, of at least 0.000010 parts per part of petroleum paraffin wax and/or asphaltenes, more preferably at least 0.000025 parts per part of petroleum paraffin wax and/or asphaltenes, and even more preferably at least 0.00025 parts per part of petroleum paraffin wax and/or asphaltenes.

In the methods of the present invention, preferably the surface active agent is present in an amount, by volume, of at least 0.0000010 parts per part of petroleum paraffin wax and/or asphaltenes, more preferably at least 0.0000050 parts per part of petroleum paraffin wax and/or asphaltenes, and even more preferably at least 0.000025 parts per part of petroleum paraffin wax and/or asphaltenes.

In the methods of the present invention using a diluent, the diluent is preferably crude oil, petroleum distillates, turpentine, pine oil, gas-to-liquid fuels (G.T.L.), vegetable oil, fatty acids, a blend of fatty acids, esterified fatty acids, amidified fatty acids, turpentine, pine oil, glycol ethers, or n-methyl-2-pyrrolidone aka M-PYROL, or a combination of two or more of these. The petroleum distillate can be diesel, light cycle oil, lube base oil, mineral oil, vacuum gas oil, middle distillate, kerosene, crude oil tank bottoms, asphalt crude oil, naphtha, or fuel oil, or a combination of two or more of these. The vegetable oil is preferably castor oil, coconut oil, corn oil, cottonseed oil, linseed oil, oiticica oil, olive oil, peanut oil, perilla oil, rapeseed oil, safflower oil, soybean oil, sunflower oil, or tung oil, or a combination of two or more of these. The diluent is preferably present in an amount, by volume, of about 0.5 to about 33 parts per part of petroleum paraffin wax and/or asphaltenes, more preferably about 0.5 to about 12 parts per part of petroleum paraffin wax and/or asphaltenes, even more preferably about 0.5 to about 5.0 parts per part of petroleum paraffin wax and/or asphaltenes, even more preferably about 0.5 to about 2.5 parts per part of petroleum paraffin wax and/or asphaltenes, even more preferably about 0.5 to about 1.5 parts per part of petroleum paraffin wax and/or asphaltene, and even more preferably about 0.5 to about 1 parts per part of petroleum paraffin wax and/or asphaltenes.

In the methods of the present invention, preferably the wax contained in crude oil sludge is transformed into an amorphous form of wax; the amorphous form of wax is preferably soluble in crude oil and resists separation from crude oil at ambient temperature; preferably, the amorphous form of wax is dissolved into crude oil and is prevented from separating out or precipitating from crude oil at ambient temperature and will stay in solution indefinitely at ambient temperatures (at least around 24° C.); preferably, the amorphous form of wax is dissolved into crude oil and is prevented from separating out or precipitating from crude oil at ambient temperature and will stay in solution indefinitely at ambient temperatures (around 24 to 40° C.).

In the methods of the present invention using a diluent, preferably the blend is added to the crude oil or refined distillate products before the diluent is added.

Preferably, the plasticizing agent in the composition of the present invention includes tributoxyethylphosphate (KP-140); more preferably, the plasticizing agent consists essentially of tributoxyethylphosphate (KP-140); most preferably, the plasticizing agent consists of tributoxyethylphosphate (KP-140).

Preferably, the paraffin wax comprises crystalline petroleum paraffin wax and the asphaltenes comprise high molecular weight polyaromatic asphaltenes.

Preferably, the paraffin wax comprises crystalline petroleum paraffin wax.

Preferably, the asphaltenes comprise high molecular weight polyaromatic asphaltenes.

Preferably, the solubilizing agent comprises soybean oil. More preferably, the solubilizing agent consists essentially of soybean oil. Most preferably, the solubilizing agent consists of soybean oil.

Preferably, the diluent comprises diesel. More preferably, the diluent consists essentially of diesel. Even more preferably, the diluent consists of diesel.

The diluent can comprise crude oil; when it does, it preferably consists essentially of crude oil, and even more preferably consists of crude oil.

Preferably, the substantially non-aqueous composition of the present invention includes not more than 10% water by weight, more preferably not more than 5% water by weight, even more preferably not more than 1% water by weight, and most preferably not more than 0.5% water by weight.

The present invention includes a method of liquefying and dissolving crystalline petroleum paraffin wax and high molecular weight polyaromatic asphaltenes found in petroleum into a diluent comprising crude oil and/or refined distillate products with a minimum to no separation from the diluent, comprising mixing the petroleum with the diluent and with a chemical composition of matter that is made by blending the following components: a wax plasticizing agent (plasticizer), tributoxyethyl phosphate (aka KP-140 or TBEP) that comprises between 0.5 to 98 percent by weight of the blend; a blend of fatty acids comprising myristic, palmitic, stearic, oleic, linoleic and lineoleic acids in which the blend comprises between 5.0 to 90 percent by weight of the blend; and a mixture of surface active agents capable of reducing the surface tension of the final solution to an interfacial surface tension of less than 1 dyne per cm, and comprising between 0.5 to 2.5 percent by weight of the blend. Preferably, the surface tension of the final product is lower than if the blend were not used. Preferably, the crystalline wax contained in crude oil sludge is transformed into an amorphous form of wax. Preferably the crystalline wax converts to an amorphous (liquefied) wax which is soluble in crude oil and resists separation from crude oil at ambient temperature. Preferably liquefied wax is dissolved into crude oil and is prevented from separating out or precipitating from crude oil at ambient temperature and will stay in solution indefinitely at ambient temperatures (around 24 to 40° C.). Preferably, the B.S. & W. or rag layer of crude oil in downhole crude oil production operations is lowered. Preferably, crystalline petroleum wax is converted into an amorphous or liquid form of wax so the wax can be dissolved into crude oil or refined distillate products such as diesel with the final result being a decrease in the B.S. & W. of the final hydrocarbon mixture. Preferably, the blend comprises a wax plasticizing agent (plasticizer) tributoxyethylphosphate, a selected blend of fatty acids and a blend of nonionic surface tension reducing wetting agents, capable of solubilizing crystalline wax by liquefaction and solubilizing asphaltenes into crude oil and lowering the coefficient of friction (drag coefficient) of the crude oil or refined distillate products during transport in pipelines. Preferably, the blend of fatty acids is capable of lowering the coefficient of friction, surface tension and viscosity of asphaltenes so that the asphaltenes can be solubilized in crude oil and prevented from separation while in solution. Preferably, the B.S. & W. of crude oil downhole at production sites is lowered. Preferably, the viscosity of heavy crude oil (A.P.I. gravity 6.5 to 12.0 degrees—specific gravity: 1.03 to 0.986) blends with refined distillates or light crude oils is lowered. Preferably, the blend is added to the heavy crude oil in an amount of 50-500 ppm. Preferably, the composition acts as a non aqueous degreaser for blending with hydrocarbon solvents to replace chlorinated hydrocarbon solvents. Preferably, crude oil sludge (slop oil) emulsions are demulsified. Preferably, the pour point and cloud point of crude oil and distillate refined products such as diesel and lube oil is lowered.

Typically, more plasticizing agent and solubilizing agent are necessary when asphaltene components are present than when only paraffin is present. This is because asphaltene components contain more high molecular weight polynuclear aromatic compounds. For crude oil containing typical asphaltene components, approximately 5-15 times as much plasticizing agent and solubilizing agent are necessary than when only paraffin is present.

By substantially non-aqueous I mean that the amount of water present in the composition is not sufficient to substantially interfere with the method of the present invention and substantially alter the results disclosed herein.

DETAILED DESCRIPTION OF THE INVENTION

Exemplary Modes

Exemplary Composition of Matter or Product

The preferred, exemplary composition of matter or exemplary, currently preferred, wax and asphaltene liquefier and solubilizing agent of the invention is a homogeneous mixture (pure solution, one phase) of:

1. A wax leveling or plasticizing agent (plasticizer) preferably tributoxy ethyl phosphate (aka, TEBP, KP-140, Butoxyethanol Phosphate, Tributyl Cellosolve Phosphate and Tris (2-Butoxyethyl) Ester of Phosphoric Acid), in the concentration range of 0.5 to 95 weight percent with the optimum concentration of around 40-60 weight percent.
2. A mixture of fatty acids (such as those listed in Table 1) capable of lowering the coefficient of friction of and in solubilizing of the composition of matter described herein. An optimum mixture of fatty acids will contain the following acids and the respective weight percentages in the mixture: myristic 0.5%, palmitic 10%, stearic 2.5%, oleic 30%, linoleic 52% and linolenic 5.0%. The mixture of fatty acids is added to the exemplary composition of matter or product in the concentration range of 5.0 to 90 weight percent, with the optimum concentration being about 40-60 weight percent.
3. A mixture of surface active agents capable of reducing the surface tension of a chemical mixture as well as reducing the coefficient of friction of the composition of matter described herein. The mixture of surface active agents preferably comprises eighty weight percent of a nonionic polyolether surfactant with a H.L.B. value of 10.5 and a critical micelle concentration of 0.006% of the nonionic polyolether surfactant, ten weight percent of a nonionic phosphate surfactant with a calculated H.L.B. value of 6.7 and a critical micelle concentration of 0.005% of the nonionic phosphate surfactant and capable of lowering the interfacial surface tension between water and hydrocarbon to less than 20 dynes/cm2 (preferably to less than 1.0 dynes/cm2) and ten weight percent of a nonionic fluorosurfactant with good leveling action and wettability. The mixture of surface active agents is preferably added to the exemplary composition of matter or product in the concentration of 0.1 to 2.5 weight percent with the optimum concentration being 1.0 weight percent.

One particularly preferred exemplary composition contains 49.5 weight percent tributoxy ethyl phosphate, 49.5 weight percent of the fatty acid mixture (preferably a vegetable oil, such as soybean oil) and 1.0 weight percent of the mixture of surface active agents.

TABLE 1

Composition of fatty acid mixtures

| Fatty acid | percentage in mixture |
|---|---|
| Mysistic | 0.1 to 2.0% |
| Palmitic | 7.5 to 10.2% |
| Stearic Acid | 2.0 to 3.0% |
| Oleic Acid | 25.0 to 56.0% |
| Linoleic Acid | 35.0 to 52.0% |
| Linolenic Acid | 0.1 to 6.5% |

At ambient temperature (e.g. 75 degrees Fahrenheit, 24 degrees Celsius) 0.2 ml (1,000 P.P.M.) of the exemplary composition was added to 200 ml of crude oil. The crude oil was obtained from an oil company located in Southern Mississippi (Tuscaloosa Trend formation—Magnolia field). The mixture was stirred for a period of one hour at ambient temperature. At the end of the mixing period a sample was taken to determine the B.S. & W. of the crude oil. The B.S. & W. of a crude oil is a measure of how much hydrocarbon sludge material (paraffin or asphaltene) that will separate from crude oil on standing at ambient temperature.

Measurements were made using the A.S.T.M. method D4007-81 (centrifuge). The results of test #1 are listed in Table 2.

TABLE 2

| Test Number (a) | Concentration of additive Percent of Solution (PPM) | Time/Temp/B.S. & W. (b) | Percentage reduction in B.S. & W. |
|---|---|---|---|
| 1 | 0.1% (1000) | 1 hour/24° C./0.25% | 92% |
| 2 | 0.1% (1000) | 1 hour/70° C./0.00% | 100% |
| 3 | 0.05% (500) | 1 hour/70° C./0.00% | 100% | a - The measurements were made using the A.S.T.M. = D4007-81 method
b - The original crude oil had a B.S. & W. of 3 percent (90 percent paraffin + 10 percent asphaltene)

The same test as described in test #1 was repeated but at 158 degrees Fahrenheit (70 degrees Celsius) for a period of one hour. At the end of the heating and stirring time period the sample was tested by the A.S.T.M. method # D4007-81 (centrifuge) to determine the amount of paraffin that separated from solution. The results of this test are listed in Table 2.

Test #3

At ambient temperature (e.g. 75 degrees Fahrenheit, 24 degrees Celsius) 0.1 ml (500 P.P.M.) of the exemplary composition was added to 200 ml of crude oil. The crude oil used in this test was the same as used in tests #1 and #2. After the 0.1 ml of exemplary composition was added to the mixture, it was heated and stirred for a period of 1 hour at 158 degrees Fahrenheit (70 degrees Celsius). At the end of 1 hour the mixture was sampled and the B.S.& W. was determined by A.S.T.M. method D4007-81 (centrifuge). The results of this test are listed in Table 2.

The results of these tests indicate that the addition of the exemplary composition additive will lower or totally eliminate the separation or deposition of hydrocarbon sludge from crude oil, by liquefying and dissolving the paraffin waxes and asphaltenes into crude oil.

B. Sludge Solubilization and Dispersion Tests

Test 4

At ambient temperature (e.g. 75 degrees Fahrenheit, 24 degrees Celsius), 200 ml of light naptha condensate (A.P.I. gravity 51 degrees—specific gravity 0.78) was added to 200 ml of crude oil tank bottom sludge (containing 80 percent paraffin and 20 percent solids (rust and sand) with an A.P.I. gravity of 12.5 degrees—specific gravity 0.98). This mixture was stirred at room temperature for a period of one hour. After mixing for one hour the mixture was allowed to sit overnight.

After sitting overnight at ambient temperature, the B.S. & W. of the upper layer (naptha condensate and dissolved hydrocarbon) was measured by the A.S.T.M. method D-4007-81 (centrifuge). The upper naptha layer yielded a B.S. & W. of 46 percent. This indicates that 54 percent of the paraffin in the sludge was dissolved in the naptha and the remaining 46 percent separated out of the naptha condensate tank bottom sludge mixture.

Test 5

Test 4 was repeated under the same conditions with the addition of 0.2 ml (1000 P.P.M.) of the exemplary composition of matter product (additive) and stirred for a period of one hour. After the mixture was stirred for one hour it was allowed to sit overnight.

After sitting overnight at ambient temperature, the B.S. & W. of the upper layer (naptha condensate and dissolved hydrocarbon) was measured by the A.S.T.M. method D-4007-81 (centrifuge). The upper naptha condensate layer yielded a B.S. & W. of 3 percent. Thus indicating that 97 percent of the paraffin fractions in the crude oil tank bottom sludge was dissolved in the naptha condensate and only 3 percent separated out. The A.P.I. gravity of this mixture of naptha condensate, paraffin wax and asphaltene containing the exemplary composition of matter (additive) decreased from 51 degrees (specific gravity 0.78) for the pure naptha condensate to a final API gravity of 28 degrees (specific gravity 0.90) for the naptha condensate+crude oil tank bottom blend. This final blend was observed to be pumpable.

Fatty Acid Esters and Amides

The composition used in the methods of the claimed invention contains ingredients in amounts effective to liquefy and reclaim paraffin wax and asphaltene.

The fatty acid alkyl ester blends useful in compositions of the present invention preferably contain $C_2$ to $C_{10}$ esters of $C_4$ to $C_{22}$ fatty acids having the formula:

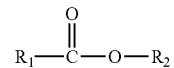

wherein $R_1$ is $C_4$ to $C_{22}$ alkyl acid and $R_2$ is $C_2$ to $C_8$ alkyl alcohol. Fatty acid esters are derived from natural products, and thus usually comprise more than one ester—hence blend. Typically, fatty acid esters are derived from the esterification of fatty acids or the transesterification of animal fats or vegetable oils.

The fatty acid alkyl ester blend more preferably contains methyl, ethyl, n-propyl, isopropyl, or n-butyl esters of $C_4$ to $C_{22}$ fatty acids. Most preferably, the fatty acid alkyl ester blend contains methyl esters. The fatty acid methyl ester blends are preferably blends with a cloud point of at most 40° F. (14° C.) and a high degree of unsaturation to increase solvency. More preferably, the fatty acid methyl ester blends are derived from soya, canola, and other vegetable oils, with a cloud point of 20°-32° F. (−7° C.-0° C.) and an iodine value of 90-130.

The composition described herein contains ingredients in amounts effective to clean oil production wells, formations and equipment and/or to provide an effective coating on their surfaces to prevent future buildup of petroleum paraffin wax and asphaltene soils, scale and corrosion. The composition is low evaporative and provides differential wetting of the surfaces; thus, the composition will not evaporate to any significant extent and it will provide a coating that remains on the surface for useful periods of time.

An embodiment of the chemical composition described herein includes a paraffin wax and asphaltene solubilizing additive in the form of fatty acids. These fatty acids can be in the form of a natural occurring blend as found in animal fats or vegetable oils, and/or synthetic fatty acids manufactured by the oxo process. Pure fatty acids either natural or synthetic can be replaced by their alkyl ester blends.

Alkyl amide blends can also be useful in the present invention. The preferable amines used in preparing the fatty acid amides contain $C_3$ to $C_{10}$ amides of $C_4$ to $C_{22}$ fatty acids having the formula

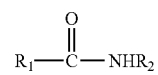

wherein $R_1$ is $C_4$ to $C_{22}$ alkyl acid and $R_2$ is $C_2$ to $C_{10}$ alkyl amine. Since the fatty acid amides are derived from natural products, and thus comprise more than one amide—hence blend, typically, fatty acid amides are derived from amidification of fatty acids and amines.

Ratio of KP-140 (TBEP) to Wax Paraffin Treated
1. Recovery of paraffin wax from petroleum sludge.
   The concentration of KP-140 needed to recover paraffin wax in petroleum sludge is preferably at least 0.000010 parts of KP-140 per part of paraffin wax.
2. Lowering of cloud point in medium viscosity base oil.
   The concentration of KP-140 needed to lower the cloud point in a medium viscosity base oil by one degree is about 0.0000182 parts of KP-140 per part of paraffin wax.
3. Lowering the separation of paraffin wax in crude oil by injection of the exemplary into a crude oil containing paraffin wax (wax content 3 to 5 percent by volume). The concentration of KP-140 needed to lower the wax separation concentration from 5 volume percent to 0.000 volume percent in this crude oil, is about 0.000005 parts of KP-140 per part of crude oil containing paraffin wax of 5 percent by volume (thus about 0.000010 parts of KP-140 per part of paraffin wax).

KP-140 is a trademark for the following chemical (synonyms):
1.) Tributoxy ethyl phosphate
2.) T.B.E.P. (trademark)
3.) Tributylcellosolve phosphate
4.) Butoxyethanol Phosphate
5.) Tris (2-Butoxyethyl) Ester of Phosphoric Acid
6.) Tributyl Cellosolve Phosphate
Chemical Name: Tributoxyethyl Phosphate
Chemical Family: Organophosphate.

Surfactants

In one particularly preferred, exemplary composition, the surface active agent includes a nonionic polyethoxylated compound, e.g., one derived from polyethylene oxide, which has a H.L.B. number 11.0.

As is known in the surfactant art, an H.L.B. number represents a fundamental property of a nonionic surfactant that correlates with both physical properties and surface active effects. The H.L.B. number is a measure of the hydrophilic and lipophilic (hydrophobic) characteristics of the surfactant molecule. In a series of surfactants prepared by the ethoxylation of an alcohol or amine, for example, the ratio of hydrophilic to lipophilic portions increases with the increasing degree of ethoxylation. This corresponds to an increase in hydrophilic character—or water solubility—of the molecule. The H.L.B. number of the surfactant determines the type of emulsion produced as well as the stability of the emulsion. A water-in-oil (W/O) type of emulsion requires emulsifiers of low H.L.B. number, e.g., about four (4) (100% water insoluble—non-dispersible in water), while on oil-in-water (O/W) type requires emulsifiers with higher H.L.B. numbers, e.g., nine to sixteen (9-16). Surfactants with H.L.B. numbers near thirteen (13) are detergents, and those of fifteen to sixteen (15-16) are stabilizers. The surface active agents in the currently preferred, exemplary product preferably have a H.L.B. number ranging from about ten to about eleven and a half (10-11.5) and are considered to be good re-wetting agents (low contact angle) and are good emulsifying and dispersing agents for oils and solids.

Another factor to be considered is the addition of a surface tension depressant. In order to enhance the effectiveness of the surface active agent, for example, a fluorocarbon alcohol is added to lower the surface tension of the composition of matter. Normally the amount added is, for example, 0.1%. Therefore, the surface active agent preferably consists of a nonionic surfactant that is made up of, for example, about 0.1% of a surface tension depressant in the form of, for example, a fluorinated hydrocarbon alcohol. The range of surface tension for the final composition of matter ranges from about 10 to about 48 dynes/cm2 and more preferably from about 15 to about 32 dynes per cm2.

The foregoing, preferred chemical mixture is referenced herein as "508MM", and preferably contains about 49% KP 140, about 49% vegetable oil, and about 2% surfactant. The vegetable oil is preferably soybean oil, and the surfactant is preferably a mixture of 1.6% Merpol SE brand nonionic ethoxylated alcohol surfactant, 0.2% Merpol A brand nonionic phosphate ester surfactant, and 0.2% Zonyl FSN brand nonionic fluoroalcohol surfactant.

Other surface active agents, which may be used in place of or in combination with the exemplary polyethylene-oxide-based, nonionic surfactants, are outlined below.

| Types of Nonionic Surfactants | H.L.B. # |
|---|---|
| 1. Ethoxylated Alcohols | 11.4 |
| tridecyl alcohol ethoxylate (6 EO) | |
| (where EO is ethylene oxide) | |
| tridecyl alcohol ethoxylate (9 EO) | 13.3 |
| tridecyl alcohol ethoxylate (12 EO) | 14.5 |
| tridecyl alcohol ethoxylate (15 EO) | 15.3 |
| Witco Chemicals' tridecyl alcohol ethoxylate | 12.4 |
| Stepan Chemicals' tridecyl alcohol ethoxylate | 12.4 |
| alcohol ethoxylate (3 EO) | 8.0 |
| alcohol ethoxylate (6 EO) | 11.8 |
| alcohol ethoxylate (8 EO) | 13.2 |
| alcohol ethoxylate (10 EO) | 14.1 |
| C8–C10 alcohol ethoxylate (6 moles) | 12.5 |
| C8–C10 alcohol ethoxylate (8 moles) | 13.6 |
| 2. Reactions of Cocoacid + Polyethylene Gylcol (PEG) | |
| PEG30 - glyceryl cocoate | 15.9 |
| PEG80 - glyceryl cocoate | 18.0 |
| PEG 30 mixture - glyceryl cocoate | 15.9 |
| PEG 20 - glyceryl tallowate | 13.0 |
| PEG80 - glyceryl tallowate | 18.0 |
| PEG200 - glyceryl tallowate | 19.0 |
| PEG2 cocamine | 6.2 |
| PEG5 cocamine | 11.0 |
| PEG10 cocamine | 13.8 |
| PEG15 cocamine | 15.4 |
| PEG15 cocamine mixture | 15.4 |
| It is noted that, as the amount of ethoxylation increases, the H.L.B. # increases, and the cationic character changes to more nonionic. | |
| PEG2 tallow amine | 5.1 |
| PEG2 tallow amine mixture | 5.1 |
| PEG5 tallow amine | 9.2 |
| PEG10 tallow amine | 12.6 |
| PEG15 tallow amine | 14.4 |
| PEG20 tallow amine | 15.4 |
| 3. Other Commercially Available, Nonionic Surfactants | |
| Nonylphenol (5 EO) | 6.8 |
| Nonlyphenol (10 EO) | 11.0 |
| Nonlyphenol (12 EO) | 12.2 |
| Nonlyphenol (15 EO) | 13.5 |
| Nonlyphenol (18 EO) | 19.5 |

3. Other Currently Non-Commercially Available, Nonionic Surfactants
a. nonionic surfactant formed from a-diol condensation products;
b. polyhydroxyl nonionic compounds;
c. nonionic surfactant formed by the reaction of an ethoxylated Schiff base with a methyl alkyl ketone;
d. i-alkyl-polyethylene-polyamines reacted with maleric acid semiamide - nonionic compound with antibiocide properties;
e. nonionic surfactant derived from polyethoxylated alcohols + vinyl-alkyl ethers;
f. biodegradable glycidol surfactant (nonionic), e.g., alcohol + gylcidol (with catalyst) producing nonionic surfactant (biodegradable);
g. multiblock polyacetal copolymer surfactants, e.g., poly-propylene oxide or polyethylene oxide + dialkyl ether;
h. urea-ethoxamer nonionic inclusion compounds, e.g., urea + polyethoxylated long chain alcohols;
i. nonionic phosphate alcohol surfactants;
j. polyglycol ethers + polyglycol 6000 + epichlorohydrine derived nonionic surfactants;
k. nonionic fluorosurfactant;
etc.

In an exemplary (preferred) composition described in the invention herein the total concentration of the surfactant mixture is 2 wt percent. The surfactant mixture preferably contains 80 wt percent of an ethoxylated nonionic surfactant with a H.L.B. # of 10.5 (can range from 10.0 to 15.0, e.g.), 10 wt percent of phosphate alcohol surfactant with a H.L.B. # of 6.7 (can range from 6 to 10, e.g.) and 10 wt percent of a fluorosurfactant with a H.L.B. # of 11 (can range from 10 to 13, e.g.).

The critical properties for surfactants that are important are the critical micelle concentration (CMC) and for nonionic surfactants, the Hydrophile-Lipophile balance (H.L.B.) and the cloud point. The H.L.B. number represents a fundamental property of nonionic surfactants that corresponds with both physical properties and surface active effects. The H.L.B. number is a measure of the ratio of hydrophilic (water loving) and lipophilic (hydrophobic—water hating) characteristics of the surfactant molecule. In a series of surfactants prepared by the ethoxylation of an alcohol or amine, for example, the ratio of hydrophilic to lipophilic portions increases with the increasing degree of ethoxylation. This corresponds to an increase in hydrophilic character or water solubility of the molecule.

Exemplary #1

The exemplary (preferred) composition described in the invention herein was used to recover paraffin from a crude oil sludge tank. The following procedure was used: to 2600 bbls (412,776 liters) of crude oil sludge containing 75 vol % paraffin and other hydrocarbons, 20 vol % water and 5 vol % solids (rust, etc.) was added with mixing 546 gals (2,064 liters) (0.5% or 5000 P.P.M.) of the preferred composition. The mixture of the preferred composition (508MM) and the crude oil sludge was mixed for a period of two hours at a temperature ranging from 50 to 75° C. After the sludge and chemical mixture became a semi-solid liquid, diesel fuel (2,600 Bbls—412,776 liters) in an amount equal to the amount of sludge treated was added to the mix tank with mixing. The mixture of diesel, crude oil sludge and the preferred chemical composition were mixed for an additional three hours at a temperature ranging from 50 to 75° C.

At the end of the mixing period it was observed that the mixture of diesel and crude oil sludge had separated into three phases. The solids at the bottom mixed with water was collected in a specially designed shell shaker. The shaker is designed to collect pieces of solid residues of a very large size and allowed the smaller particles to be dispersed in the water. The water was pumped off to a water settling tank prior to transfer to a water treatment plant.

The recovered paraffin sludge (1,950 Bbls—309,582 liters) mixed with 2600 Bbls of diesel was transferred to the refinery crude oil day storage tank for pumping back to the refinery. The recovered 1,950 Bbls (309,582 liters) of paraffin was mixed with crude oil and processed to diesel and gasoline. The chemical composition described herein did not poison any catalysts in the refinery process.

The final result was the recovery of 1,950 Bbls (309,582 liters) of paraffin hydrocarbons, 520 Bbls (82,555 liters) of water and 20 MT (130 Bbls—20,639 liters)) of solids (rust and, etc.).

Exemplary #2

Test #2—Lowering of Cloud Point and Pour Points of Base Oils and gas to Liquid (G.T.L.) Fuels A blend of the exemplary (preferred) composition aka 508MM and an oil soluble acrylic polymer Viscoplex 1-158 was prepared by mixing in a high speed mixer 150 ml of 508MM (35.2 vol %) and 300 ml of Viscoplex 1-158 (64.8 vol %). Viscoplex 1-158 is an oil soluble polymethacrylate polymer manufactured and sold by Degusa Roh-Max Oil Additives. Viscoplex 1-158 is sold on the market as a pour point depressant for petroleum lube base oils. Viscoplex 1-158 acts as a very good pour point depressant, but as a cloud point depressant shows no activity. The blend of these two components is referred to as 508MM-P-1.

The following tests were performed on a Medium Viscosity Grade Oil (G.T.L.) and a Bright Stock Base Oil. All concentrations listed are wt percent of additive in base oil. Measurements were performed using standard A.S.T.M. methods for pour point and cloud point.

The following tests were performed:

| Additive ID | None | Viscoplex 1-158 | 508MM-P | 508MM-P |
|---|---|---|---|---|
| Base Oil Tested: Medium Vis Grade Oil | | | | |
| Conc. of Base Oil | 100% | 99.60% | 99.96 | 99.80 |
| Conc. of Additive | | 0.40% | 0.04 | 0.20 |
| Total Conc. | 100% | 100.00% | 100.00% | 100.00% |
| Pour Point ° C. | −13 | −32 | −21 | −29 |
| Cloud Point ° C. | 28 | 25 | 11 | 14 |
| Base Oil Tested: Bright Stock | | | | |
| Conc. of Base Oil | 100% | 99.60% | 99.96% | 99.80% |
| Conc. of Additive | | 0.40% | .04% | 0.20% |
| Total Conc. | 100% | 100.00% | 100.00% | 100.00% |
| Pour Point ° C. | −19 | −24 | −23 | −29 |
| Cloud Point ° C. | 15 | 17 | 7 | 7 |

The addition of the exemplary composition described in this invention enhances the lowering of the cloud points and pour points of wax in petroleum lube base oils.

Exemplary #3

The use of 508MM as an antifoulant in coker heating tubes.

In the delayed coker process refinery, sludge residues, including paraffins and tars (asphaltenes) with A.P.I. gravities ranging from 1.5 to 3.5 (specific gravity: 1.06 to 1.05), are converted to petroleum coke. The sludges are passed through heating tubes at temperatures of 850 to 1000° F. (450° C. to 540° C.). At these temperatures part of the unconverted sludges and coke attach themselves to the heater tubes and inhibit the coking process. This results in clogged and corroded heater tubes. Because of this fouling taking place in the heater tubes the coker has to be shut down.

Preliminary laboratory tests carried out with 508MM (preferred exemplary composition of matter described in this invention) and a coker feedstock with an A.P.I. gravity of 1.7 (specific gravity: 1.06) resulted in a decrease in viscosity of the coker feedstock. A decrease in the viscosity indicates a greater tendency to flow and a lower tendency to form an adhesive bond with the metal surface causing fouling.

The following changes in viscosity were observed.

| Feedstock - A.P.I. gravity = 1.7 (specific gravity: 1.06) | | | |
|---|---|---|---|
| Concentration of 508MM (P.P.M.) | Temperature (° C.) | Viscosity (Cps) | % Change in Viscosity |
| 0.00 | 150° | 1,860 | 0.00 |
| 300. | 150° | 1,800 | −3.20% |
| 1,500 | 150° | 1,720 | −7.53% |
| 5,000 | 150° | 1,500 | −19.35% |
| 0.00 | 200° | 185 | 0.00 |
| 250 | 200° | 90 | −51.35% |
| 0.00 | 300° | 35 | 0.00 |
| 1,000 | 300° | 15 | −57.14% |

Exemplary #4

When a material with a large bulk density such as asphalt or paraffin is mixed with a liquid with a low density (specific gravity) such as a hydrocarbon solvent (e.g., diesel) foaming will typically occur as the asphalt starts to dissolve in the diesel. Testing with 508MM, the exemplary composition of matter described in this patent has shown that the addition of 5000 ppm (0.5%) of 508MM will reduce the foaming to such a low level that the dissolution of the solute paraffin will occur at 20 to 30 degrees centigrade lower than in the absence of 508MM. This shows that 508MM also acts as a defoaming agent.

Test performed:

A). To 100 ml of paraffin sludge with a melting point of 175° C. was added 200 ml of diesel with stirring at 160° C. As the mixing was occurring the mixture started to foam and the temperature of the mixture was increased to 180° C. to increase the rate of dissolution and thus lower the foaming.

B.) This experiment was repeated in the same manner except 0.5 ml of 508MM was added to the paraffin sludge prior to the addition of the diesel. The 508MM was to the sludge at 25 C. and mixed into the sludge until the sludge started to become liquidy. At that point the mixture was heated to 120 C. and diesel was added. No foaming was observed. The paraffin sludge became completely dissolved at 140° C. without any foaming occurring.

The composition of matter of the present invention can be used effectively in the method of the present invention at temperatures as low as 65-75 degrees F. (18-24 degrees C.).

These tests indicate that the exemplary composition of matter can be used to recover valuable hydrocarbons from crude oil tank bottoms, oil spills and hydrocarbon disposal sites.

All measurements disclosed herein are at standard temperature and pressure, at sea level on Earth, unless indicated otherwise.

It is noted that the formulations, compositions, and applications described herein generally and/or in detail were for exemplary purposes and are, of course, subject to many different variations. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limited sense.

The foregoing embodiments are presented by way of example only; the scope of the present invention is to be limited only by the following claims.

The invention claimed is:

1. A substantially non-aqueous composition for reducing the viscosity of petroleum paraffin wax and/or asphaltenes found in petroleum, the composition comprising a blend of:
   (a) a plasticizing agent, for plasticing wax or asphaltenes, comprising tributoxyethylphosphate (KP-140);
   (b) a solubilizing agent, for solubilizing wax or asphaltenes, selected from the group consisting of: crude oil, petroleum distillates, turpentine, pine oil, gas-to-liquid fuels (G.T.L.), vegetable oil, fatty acids, a blend of fatty acids, esterified fatty acids, amidified fatty acids, turpentine, pine oil, glycol ethers, and n-methyl-2-pyrrolidone aka M-PYROL; and
   (c) a surface active agent, capable of reducing the surface tension of the blend to an interfacial surface tension of less than 20 dynes per cm$^2$, selected from the group consisting of nonionic ethoxylated alcohols surfactant (HLB ranging from about 10.0 to about 15.0), nonionic fluorosurfactants (HLB ranging from about 10.0 to about 13.0), and nonionic phosphate ester surfactants (HLB ranging from about 6.0 to about 10.0), wherein the substantially non-aqueous composition includes not more than 0.5% water by weight.

2. The composition of claim 1, wherein the vegetable oil is selected from the group consisting of: castor oil, coconut oil, corn oil, cottonseed oil, linseed oil, oiticica oil, olive oil, peanut oil, perilla oil, rapeseed oil, safflower oil, soybean oil, sunflower oil, and tong oil.

3. The composition of claim 1, wherein:
   the solubilizing agent comprises fatty acids; and
   the surface active agent comprises a mixture of a nonionic ethoxylated alcohol surfactant (HLB ranging from about 10.0 to about 15.0), a nonionic fluoroalcohol surfactant (HLB ranging from about 10.0 to about 13.0), and a nonionic phosphate ester surfactant (HLB ranging from about 6.0 to about 10.0).

4. The composition of claim 1, wherein the surface active agent is capable of reducing the surface tension of the composition to an interfacial surface tension of less than 1 dyne per cm.

5. The composition of claim 1, wherein:
   the solubilizing agent comprises between about 5.0 and 90 percent by weight of the blend; and
   the surface active agent comprises between about 0.5 and 2.5 percent by weight of the blend.

6. The composition of claim 1, wherein:
   (a) the plasticizing agent comprises between about 5 and 95 percent by weight of the blend;
   (b) the solubilizing agent comprises between about 95 and 5 percent by weight of the blend; and
   (c) the surface active agent comprises between about 0.1 and about 5.0 percent by weight of the blend.

7. The composition of claim 1, wherein:
   (a) the plasticizing agent comprises about 49 percent by weight of the blend;
   (b) the solubilizing agent comprises about 49 percent by weight of the blend; and
   (c) the surface active agent comprises about 2 percent by weight of the blend.

8. A method of reducing the cloud point of a substance containing petroleum paraffin wax and/or asphaltenes, comprising adding an effective amount of the composition of claim 1 to the substance.

9. A method of reducing the pour point of a substance containing petroleum paraffin wax and/or asphaltenes, comprising adding an effective amount of the composition of claim 1 to the substance.

10. A method of degreasing paraffin and/or asphaltene containing residues and dirt in towers, columns, and other petrochemical related equipment, storage tanks, cokers, piping in petroleum refining and production sites, in marine and land transportation of petroleum products, comprising adding an effective amount of the composition of claim 1 to liquid in the towers, columns, other petrochemical related equipment, storage tanks, cokers, piping in petroleum refining and production sites, in marine and land transportation of petroleum products.

11. A method of reducing the occurrence of foaming when a material with a large bulk density such as asphalt or paraffin is mixed with a liquid with a low density (specific gravity) such as a hydrocarbon solvent (e.g., diesel), comprising adding an effective amount of the composition of claim 1 to the liquid.

12. A method of liquefying and dissolving petroleum paraffin wax and/or asphaltenes found in petroleum into crude oil and refined distillate products, comprising adding an effective amount of the composition of claim 1 to the crude oil or refined distillate products and adding a diluent.

13. The method of claim 12, wherein:
(a) the plasticizing agent is present in an amount, by volume, of about 0.000025 to 0.0025 parts per part of petroleum paraffin wax and/or asphaltenes;
(b) the solubilizing agent is present in an amount, by volume, of about 0.000025 to 0.0025 parts per part of petroleum paraffin wax and/or asphaltenes; and
(c) the surface active agent is present in an amount, by volume, of about 0.0000050 to 0.0001 parts per part of petroleum paraffin wax and/or asphaltenes.

14. The method of claim 12, wherein:
(a) the plasticizing agent is present in an amount, by volume, of at least about 0.000025 parts per part of petroleum paraffin wax and/or asphaltenes;
(b) the solubilizing agent is present in an amount, by volume, of at least about 0.000025 parts per part of petroleum paraffin wax and/or asphaltenes; and
(c) the surface active agent is present in an amount, by volume, of at least about 0.0000050 parts per part of petroleum paraffin wax and/or asphaltenes.

15. The method of claim 12, wherein:
(a) the plasticizing agent is present in an amount, by volume, of at least 0.000010 parts per part of petroleum paraffin wax and/or asphaltenes.

16. The method of claim 12, wherein:
(c) the surface active agent is present in an amount, by volume, of at least 0.0000050 parts per part of petroleum paraffin wax and/or asphaltenes.

17. The method of claim 12, wherein:
(c) the surface active agent is present in an amount, by volume, of at least 0.000025 parts per part of petroleum paraffin wax and/or asphaltenes.

18. The method of claim 12, wherein the diluent is selected from the group consisting of crude oil, petroleum distillates, turpentine, pine oil, gas-to-liquid fuels (G.T.L.), vegetable oil, fatty acids, a blend of fatty acids, esterified fatty acids, amidified fatty acids, turpentine, pine oil, glycol ethers, and n-methyl-2-pyrrolidone aka M-PYROL.

19. The method of claim 18, wherein the petroleum distillate is selected from the group consisting of: diesel, light cycle oil, lube base oil, mineral oil, vacuum gas oil, middle distillate, kerosene, crude oil tank bottoms, asphalt crude oil, naphtha, and fuel oil.

20. The method of claim 18, wherein the vegetable oil is selected from the group consisting of: castor oil, coconut oil, corn oil, cottonseed oil, linseed oil, oiticica oil, olive oil, peanut oil, perilla oil, rapeseed oil, safflower oil, soybean oil, sunflower oil, and tong oil.

21. The method of claim 12, wherein:
the diluent is present in an amount, by volume, of about 0.5 to about 2.5 parts per part of petroleum paraffin wax and/or asphaltenes.

22. The method of claim 12, wherein the wax is transformed into an amorphous form of wax.

23. The method of claim 22, wherein the amorphous form of wax is soluble in crude oil and resists separation from crude oil at ambient temperature.

24. The method of claim 22, wherein the amorphous form of wax is dissolved into crude oil and is prevented from separating out or precipitating from crude oil at ambient temperature and will stay in solution indefinitely at ambient temperatures (at least around 24° C.).

25. The method of claim 22, wherein the amorphous form of wax is dissolved into crude oil and is prevented from separating out or precipitating from crude oil at ambient temperature and will stay in solution indefinitely at ambient temperatures (around 24 to 40° C.).

26. The invention of claim 1, wherein the plasticizing agent consists of tributoxyethylphosphate (KP-140).

27. The invention of claim 1, wherein the plasticizing agent consists essentially of tributoxyethylphosphate (KP-140).

28. The invention of claim 1, wherein the paraffin wax comprises crystalline petroleum paraffin wax.

29. The invention of claim 1, wherein the solubilizing agent comprises soybean oil.

30. The method of claim 12, wherein the diluent comprises diesel.

31. The method of claim 12, wherein the diluent comprises crude oil.

32. A method of liquefying and dissolving crystalline petroleum paraffin wax and high molecular weight polyaromatic asphaltenes found in petroleum into a diluent comprising crude oil and/or refined distillate products with a minimum to no separation from the diluent, comprising mixing the petroleum with the diluent and with a substantially non-aqueous chemical composition of matter that is made by blending the following components:
(a) a wax plasticizing agent (plasticizer), tributoxyethyl phosphate (KP-140) that comprises between 0.5 to 98 percent by weight of the blend;
(b) a blend of fatty acids comprising myristic, palmitic, stearic, oleic, linoleic and lineoleic acids in which the blend comprises between 5.0 to 90 percent by weight of the blend; and
(c) a mixture of surface active agents capable of reducing the surface tension of the final solution to an interfacial surface tension of less than 1 dyne per cm, and comprising between 0.5 to 2.5 percent by weight of the blend, wherein the substantially non-aqueous composition includes not more than 0.5% water by weight.

33. The method of claim 32 wherein a final product results from the method, and the surface tension of the final product is lower than if the blend were not used.

34. The method of claim 32, wherein liquefied wax is dissolved into crude oil and is prevented from separating out or precipitating from crude oil at ambient temperature and will stay in solution indefinitely at ambient temperatures (around 24 to 40° C.).

35. The method of claim 32, wherein the B.S. & W. or rag layer of crude oil in downhole crude oil production operations is lowered.

36. The method of claim 32, wherein crystalline petroleum wax is converted into an amorphous or liquid form of wax so the wax can be dissolved into crude oil or refined distillate products such as diesel with the final result being a decrease in the B.S. & W. of the final hydrocarbon mixture.

37. The method of claim 32, wherein the blend comprises a wax plasticizing agent (plasticizer) tributoxyethylphosphate, a selected blend of fatty acids and a blend of nonionic surface tension reducing wetting agents, capable of solubilizing crystalline wax by liquefaction and solubilizing asphaltenes into crude oil and lowering the coefficient of friction (drag coefficient) of the crude oil or refined distillate products during transport in pipelines.

38. The method of claim 32, wherein the blend of fatty acids are capable of lowering the coefficient of friction, surface tension and viscosity of asphaltenes so that the asphaltenes can be solubilized in crude oil and prevented from separation while in solution.

39. The method of claim 32, wherein the viscosity of heavy crude oil (A.P.I. gravity 6.5 to 12.0 degrees—specific gravity: 1.03 to 0.986) blends with refined distillates or light crude oils is lowered.

40. The method of claim 32, wherein the composition acts as a non aqueous degreaser for blending with hydrocarbon solvents to replace chlorinated hydrocarbon solvents.

41. The method of claim 32, wherein crude oil sludge (slop oil) emulsions are demulsified.

42. The method of claim 32, wherein the pour point and cloud point of crude oil and distillate refined products such as diesel and lube oil is lowered.

* * * * *